Feb. 16, 1926.   1,572,948
R. T. PIERCE
GRAPHIC METER CONTROL MECHANISM
Filed July 11, 1922
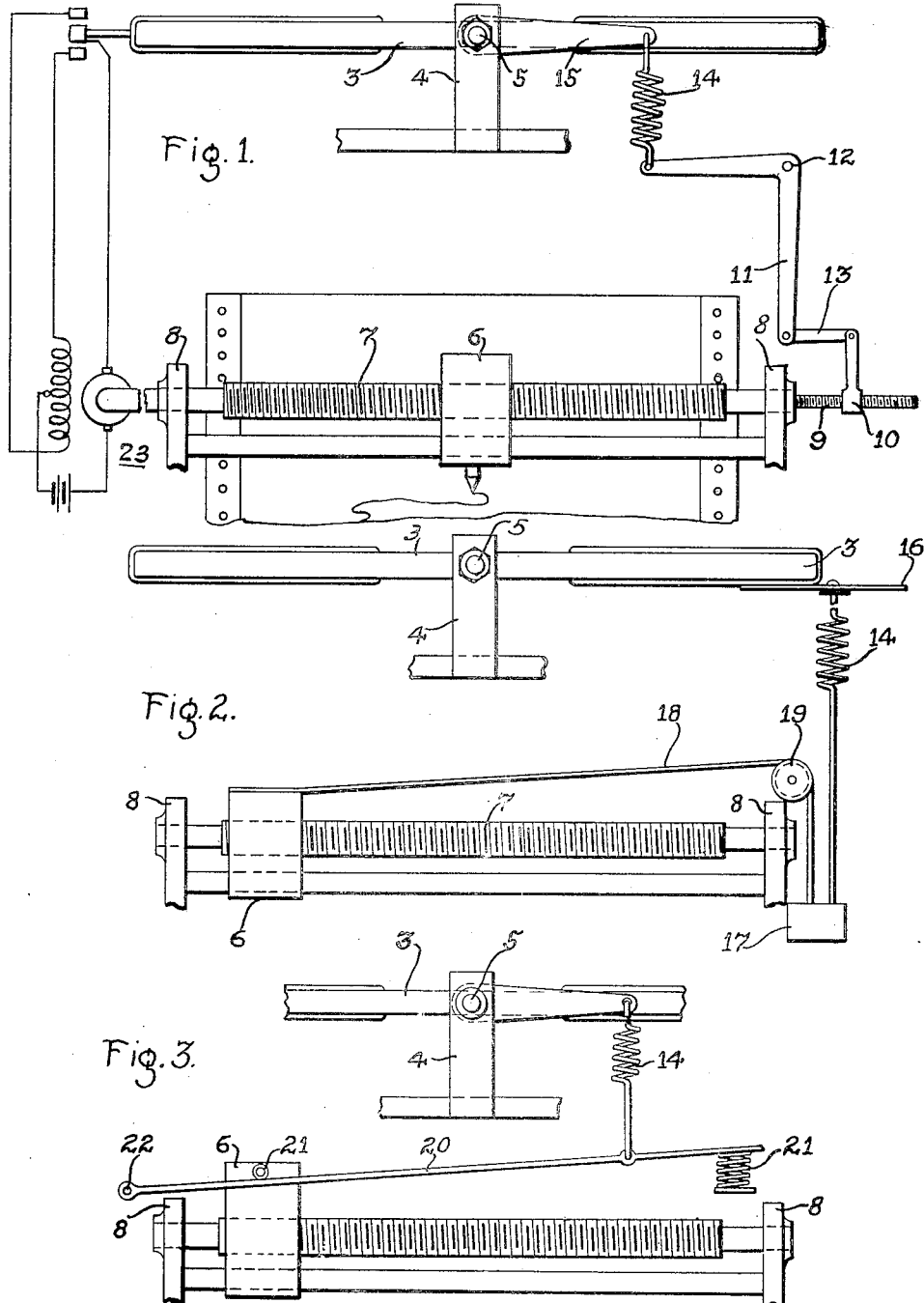
WITNESSES:
R. J. Butler.
F. H. Miller
INVENTOR
Raymond T. Pierce.
BY
Wesley G. Carr
ATTORNEY Patented Feb. 16, 1926.

1,572,948

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

GRAPHIC-METER-CONTROL MECHANISM.

Application filed July 11, 1922. Serial No. 574,259.

*To all whom it may concern:*

Be it known that I, RAYMOND T. PIERCE, a citizen of the United States, and a resident of East Pittsburgh, in the county of Allegheny and State of Pennsylvania, have invented a new and useful Improvement in Graphic-Meter-Control Mechanisms, of which the following is a specification.

My invention relates to measuring instruments and particularly to control means for the indicating members of recording instruments.

The object of my invention is to provide a device of the above-indicated character in which angularly and rectilinearly movable control and indicating members, respectively, shall be so connected as to move by proportionate increments in response to proportionate changes in the values of the quantity being measured, thereby rendering the indications of the instrument more accurate throughout the range of indicating or recording movement.

In my co-pending application Serial No. 574,261, filed July 11, 1922, electrical measuring instruments, to which reference may be had to assist in understanding my present invention, are set forth mechanisms operative in accordance with the broad principle of compensating for the differences in movement between angularly and rectilinearly movable control and indicating members.

Heretofore, it has been usual, in certain graphic meters, such as that shown in Patent No. 1,289,503, for an electrical measuring instrument, issued December 31, 1918, to P. MacGahan, to provide a traveling nut device, constituting a pen or stylus carriage, that has been adapted to move in a rectilinear horizontal direction on a motor-operated screw shaft. A Kelvin balance, responsive to a quantity to be measured, was adapted, through the usual contact members, to control the movement of the nut. A pivoted cam-and-spring connection, between the Kelvin balance and the nut, was adapted to oppose movement of the balance by increasing amounts in accordance with increased current in the balance. However, in such structure, the difference in the amount of movement between the angularly movable member of the balance and the movement of the rectilinearly movable nut, caused by frictional wear of the cam, effected errors on certain portions of the instrument scale. Error was also caused in accordance with the sine of the angle of movement of the pivoted cam.

In practicing my present invention, I provide, between the angularly movable member of a Kelvin balance and the rectilinearly movable pen or stylus carriage, means unaffected by such frictional wear for opposing movement of the angularly movable member by uniform or proportionate amounts in accordance with the direction and extent of movement of the rectilinearly movable member.

More particularly, my present invention relates to the specific improved structure required in the adaptation of a helical spring to a structure operative in accordance with the broad principles set forth in the above-mentioned application.

Figure 1 of the accompanying drawings is a view of portions of a measuring instrument embodying my invention, and, Figs. 2 and 3 are similar views of modified forms thereof.

In all of the figures, in which similar parts are designated by similar reference characters, a movable member 3 of a Kelvin balance is pivoted to a bracket 4, by a pin 5, and is adapted to control, through a pilot motor 23, the movement of a traveling-nut or pen-carriage device 6 which is mounted on a screw shaft 7 having bearings or supporting brackets 8.

In the device of Fig. 1, an extension shaft or screw 9 on the shaft 7 is so provided with threads, of smaller pitch than the threads on the shaft 7, as to move an auxiliary traveling nut member 10 a relatively small total distance in proportion to movement of the nut 6. A bell-crank lever member 11, pivoted to a stationary pin 12, is connected, at one end, by a link 13, to the member 10 and, at its other end, to a helical spring 14 that is connected to the member 3 through an arm 15.

Since the lower end of the lever 11 travels a relatively short total distance, the spring 14 is moved substantially proportionate increments in accordance with the movement of the nut 6.

In the form of device shown in Fig. 2, the spring 14, connected to the member 3 by a member 16, is provided, at its lower end, with a weight member 17 that is connected to the nut 6 by a flexible member or cord 18 that extends over a pulley 19. As the nut 6 moves along the shaft 7, the member 17 is lowered or raised to increase or decrease tension on the spring 14 in proportion to movement of the nut 6.

In the form of device shown in Fig. 3, a pivoted member 20 is connected to the spring 14 and adapted to be deflected by a roller 21 on the nut 6. A compression spring 21 may also be provided to assist in balancing the member 20 in its zero position.

By reason of the relatively great radius described by the lower end of the spring 14 about the pivot point 22 of the member 20, the spring 14 will be deflected by substantially uniform increments proportional to the movement of the nut 6.

Each of the above-described forms of my invention is free of the relatively long friction wearing surface of the cam employed in the device of the hereinbefore-mentioned MacGahan patent and is substantially free of any friction-wearing surfaces, similar to the surfaces of said cam, tending to affect the values of the forces by which the springs oppose movement of the movable balance element.

While I have shown and described various forms of my invention, changes may be effected therein without departing from the spirit and scope thereof as set forth in the appended claims.

I claim as my invention:

1. In a measuring instrument, the combination with a rotatable shaft and a Kelvin balance to be energized in accordance with a circuit to be measured for controlling the operation of the shaft, of means for opposing movement of the balance, including a spring and an auxiliary rotatable member responsive to rotation of the shaft.

2. In a measuring instrument, the combination with a rectilinearly-movable indicating member and a Kelvin balance for controlling the operation of the same, of means including a gear-reducing device connected between the indicating member and the balance for opposing movement of the balance.

3. In a measuring instrument, the combination with a rectilinearly-movable indicating member and a Kelvin balance for controlling the operation of the same, of means including a spring connected between the indicating member and the balance for opposing movement of the balance and a gear device for reducing movement of the spring.

4. In a measuring instrument, the combination with a rectilinearly-movable indicating member and a Kelvin balance for controlling the operation of the same, of means for opposing movement of the balance including a spring, a lever member and a gear reducing device connected between the indicating member and the balance.

5. In a measuring instrument, the combination with a rectilinearly-movable indicating member and a Kelvin balance for controlling the operation of the same, of an angularly-movable member having its axis of movement extending parallel to the pivot axis of the balance, said angularly-movable member being operatively related to the indicating member to be moved about its axis in accordance with movement of the indicating member, and a helical spring connected between said angularly-movable member and the balance to be stressed in the direction of its longitudinal axis with substantially a minimum of angular deflection thereof.

In testimony whereof, I have hereunto subscribed my name this first day of July 1922.

RAYMOND T. PIERCE.